Oct. 6, 1964 E. C. BECK ETAL 3,151,868
COMBINED COMPRESSION AND OIL RING ASSEMBLY
Filed Oct. 11, 1961 2 Sheets-Sheet 1
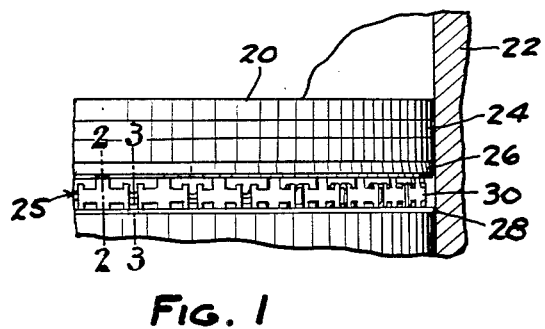
FIG. 1
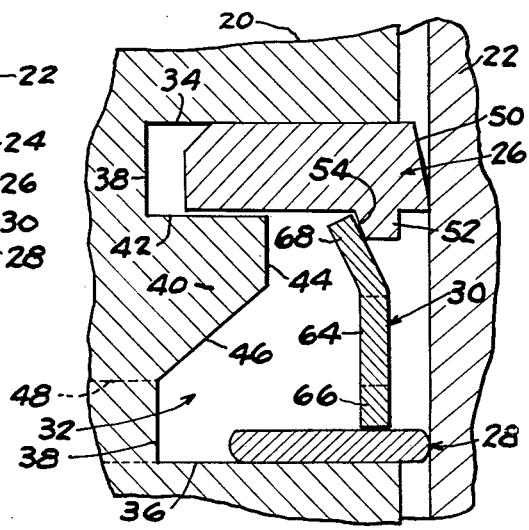
FIG. 2
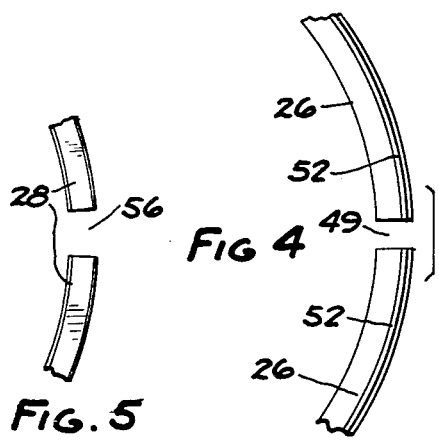
FIG. 4
FIG. 5
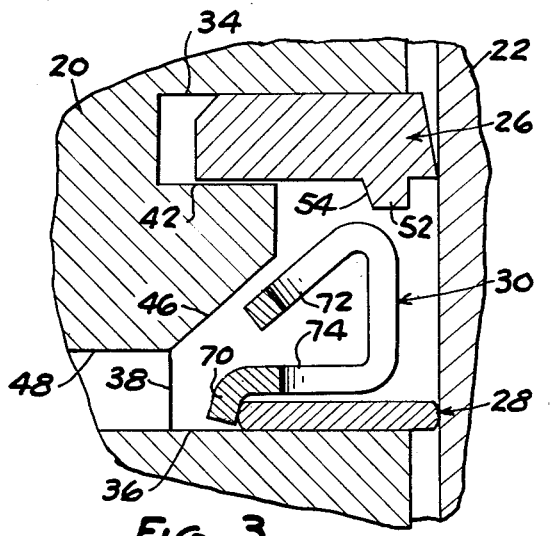
FIG. 3
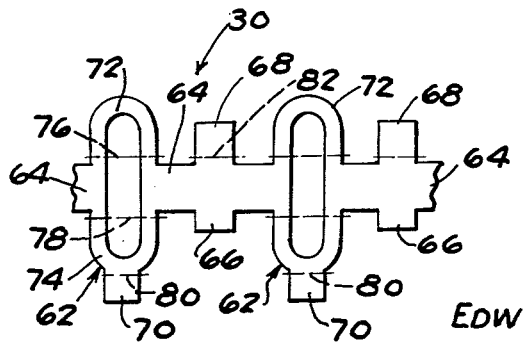
FIG. 6
INVENTORS
EDWIN C. BECK & LEE H. SAYLOR
BY
Barnes, Kisselle, Raisch & Choate
ATTORNEYS

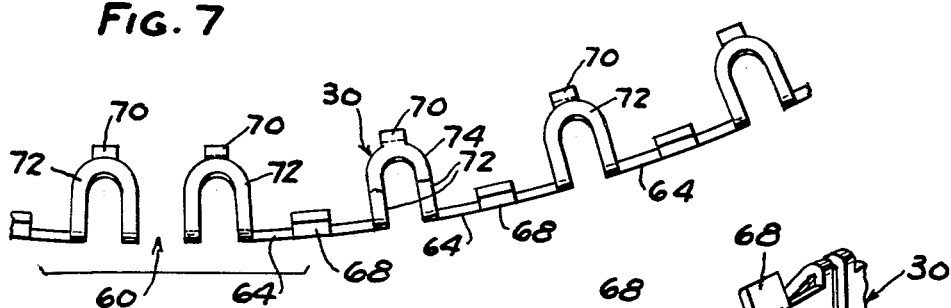
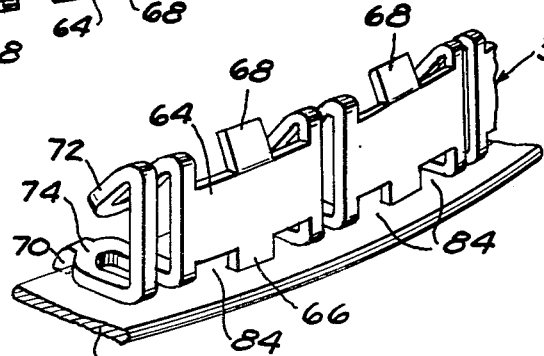
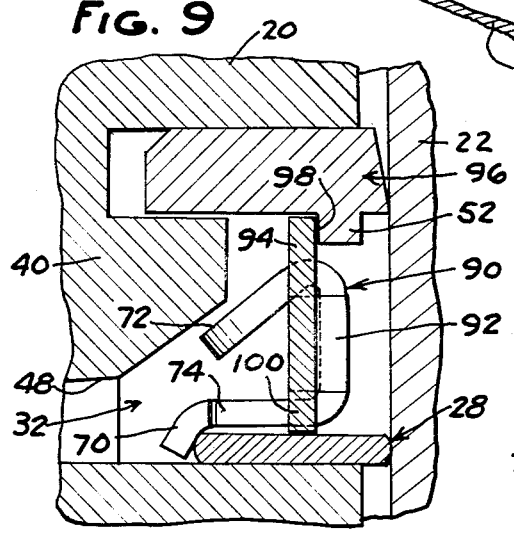
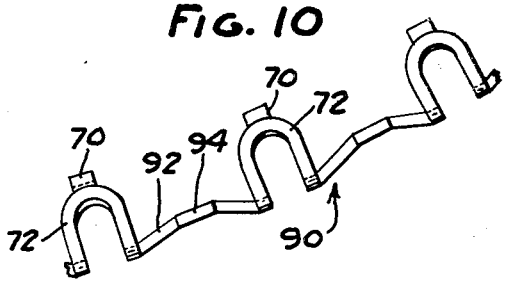

United States Patent Office 3,151,868
Patented Oct. 6, 1964

3,151,868
COMBINED COMPRESSION AND OIL RING ASSEMBLY
Edwin C. Beck and Lee H. Saylor, Muskegon, Mich., assignors to Sealed Power Corporation, Muskegon, Mich., a corporation of Michigan
Filed Oct. 11, 1961, Ser. No. 144,331
6 Claims. (Cl. 277—140)

This invention relates to a piston ring assembly for an internal combustion engine.

An object of the present invention is to provide an improved piston ring assembly wherein a compression ring and an oil rail segment are mounted in a single groove in the piston in order to reduce the length of the piston and consequently the overall height of the engine.

Another object is to provide an improved expander-spacer for a ring assembly of the above character which may be readily formed from flat ribbon stock with a minimum of material and bending operations being required to complete the finished form of the expander-spacer.

A further object is to provide an improved expander-spacer of the above character which provides close tolerance spacing of the compression ring from the oil rail segment as well as unobstructed passages adjacent the oil rail segment for draining oil collected between the compression ring and the oil rail segment.

In the accompanying drawing:

FIG. 1 is a fragmentary elevational view of a piston equipped with a combined compression and oil ring assembly of the present invention.

FIG. 2 is an enlarged sectional view taken on the line 2—2 of FIG. 1.

FIG. 3 is an enlarged sectional view taken on the line 3—3 of FIG. 1.

FIG. 4 is a fragmentary plan view of the underside of the compression ring of the ring assembly.

FIG. 5 is a fragmentary plan view of the oil rail segment of the ring assembly.

FIG. 6 is a fragmentary plan view of the expander-spacer of the ring assembly after having been punched from flat ribbon stock but prior to being bent to the final shape thereof.

FIG. 7 is an enlarged fragmentary plan view of the completed expander-spacer.

FIG. 8 is an enlarged fragmentary perspective view of the completed expander-spacer.

FIG. 9 is an enlarged sectional view corresponding to the view of FIG. 2 but illustrating a modified form of expander-spacer also provided in accordance with the present invention.

FIG. 10 is a fragmentary plan view of the expander-spacer of FIG. 9.

Referring in more detail to the drawings, FIG. 1 shows a piston 20 adapted to reciprocate in a cylinder 22 of an internal combustion engine. Piston 20 is equipped with a conventional solid compression ring 24 supported in the upper ring groove thereof and a combined compression and oil ring assembly 25 of the present invention is supported in a single, enlarged lower ring groove 32 of piston 20. The combined ring assembly 25 comprises a solid cast iron compression ring 26, a thin flat oil rail segment 28 and a combined expander-spacer 30 disposed between compression ring 26 and oil rail 28.

Referring to FIGS. 2 and 3, the lower groove 32 of piston 20 has a larger axial dimension between the top and bottom walls 34 and 36 thereof than that of the upper groove of the piston. However, despite the provision of the oversize lower groove 32, piston 20 is shorter in overall axial dimension than conventional three-groove pistons due to the elimination of the land usually provided between the middle and bottom ring grooves of such pistons. An annular integral ledge 40 projects radially outward from the vertical or axial back wall 38 of groove 32, the radial dimension of ledge 40 being approximately half the radial depth of the groove. Ledge 40 has an upper surface 42 parallel to and spaced from the groove top wall 34, a vertical peripheral surface 44 and an inclined underside 46. However, it is to be understood that ledge 40 can have any suitable cross-sectional configuration so long as the upper sealing surface 42 is provided substantially as disclosed. A series of radial oil slots 48 (FIG. 3) are provided for draining oil collecting along the back wall 38 and the underside 46 of ledge 40 back to the crankcase via the hollow interior of the piston.

The compression ring 26 is a solid, annular, cast iron ring which is parted at its ends to provide a gap 49 (FIG. 4) and which is axially dimensioned to be slidably received between the groove top wall 34 and the ledge upper surface 42 (FIG. 2). In accordance with conventional design the outer peripheral face 50 of compression ring 26 may be inclined inwardly and upwardly from the wall of cylinder 22 so as to cause an oil wedge to be formed which reduces frictional drag on the upstroke of piston 20 and to provide efficient oil scraping action on the downstroke of the piston. The underside of compression ring 26 has an integral flange 52 dependent therefrom and extending circumferentially therearound near the outer periphery of ring 26 (FIG. 4). The backside 54 of compression ring flange 52 is inclined downwardly and outwardly from the underside of compression ring 26.

The oil rail segment 28 of ring assembly 25 is positioned adjacent the groove bottom wall 36 and consists of a thin, flat, annular steel rail parted at its ends to provide a gap 56 therebetween (FIG. 5) which, like the compression ring gap 49, remains open after the rail is compressed to operating diameter. The outer peripheral face of rail segment 28 is preferably rounded and chromium plated for long wearing, high pressure sliding engagement with the wall of cylinder 22.

The improved combination expander-spacer spring 30 of the present invention comprises a generally circular, one-piece, circumferentially resilient member having a parting gap 60 at its ends (FIG. 7) to facilitate assembly in the ring groove, gap 60 being normally closed when expander-spacer 30 is compressed to operating diameter in ring assembly 25.

Expander-spacer 30 is preferably made by first producing the flat blank shown in FIG. 6 from a flat ribbon of spring steel by running the blank through a close tolerance blanking die. The flat, die-punched expander-spacer blank comprises a series of oblong loops 62 spaced longitudinally from one another by a connecting wall 64 which is integrally joined to the center of the adjacent sides of each pair of adjacent loops 62. A lip 66 extends downwardly from the center of the lower edge of connecting wall 64 and a somewhat longer lip 68 extends upwardly from the upper edge of wall 64 opposite lip 66, the distance between the upper edge of lip 68 and the lower edge of lip 66 being held within accurate limits by the die blanking operation. The bottom curved end of each loop 62 also has an integral lip 70 extending downwardly therefrom.

The above expander-spacer punching is formed into the finished expander-spacer configuration illustrated in FIGS. 7 and 8 by bending the top and bottom curved ends of each oblong loop 62 respectively along the bending lines 76 and 78 (FIG. 6) through respective angles of approximately 135 and 90 degrees to form top and bottom U-shaped loops 72 and 74. The lips 70 at the curved end of each bottom loop 74 are bent downwardly along the line 80 to the shape illustrated in FIG. 3. The upper lip 68 of each connecting wall 64 is bent slightly inward along line 82 to a position parallel to the inclined backside 54 of the compression ring flange 52 (FIG. 2).

It is to be noted that each lower lip 66 extends downwardly beyond the bottom surfaces of the adjacent bottom U-shaped spring loops 74. Hence, after the punched and bent expander-spacer 30 is curved to its final circular shape and assembled with compression ring 26 and oil rail 28, the bottom U-shaped loops 74 lie spaced above the upper surface of oil rail 28 with lips 70 overlying the inner peripheral edge thereof. With the bottom spring loops 74 thus spaced above oil rail segment 28 there is less chance of carbon deposits building up on the upper surface of rail 28 which, if allowed to build up, would tend to restrict the circumferential flexing of spring loops 74 and thereby impair the expanding function of the expander-spacer. The upper U-shaped loops 72 are spaced similarly from and inclined parallel to the underside 46 of ledge 40.

The upper inclined lips 68 of expander-spacer 30 support the outer peripheral portion of compression ring 26 while ledge 40 supports the inner peripheral portion thereof, thereby maintaining ring 26 adjacent the groove top wall 34. The bottom lips 66 of expander-spacer 30 bear on the upper surface of oil rail segment 28 to maintain it in position adjacent the groove bottom wall 36. The inclination of upper lips 68 of expander-spacer 30, and similarly the inclination of the bottom lips 70 thereof, produce axially directed forces which respectively urge compression ring 26 and oil rail segment 28 into sealing contact against the top and bottom walls 34 and 36 of ring groove 32. Lips 68 and 70 also provide a circumferentialy staggered engagement of expander-spacer 30 with compression ring 26 and rail 28. Hence the circumferential expansion forces developed in the U-shaped spring loops 72, 74 of the expander-spacer are more evenly distributed in urging compression ring 26 and oil rail 28 radially outward into sealing engagement with the wall of cylinder 22.

In operation, the compression ring 26 functions as a seal against loss of compression, and on the downstroke of the piston serves to scrape oil downwardly from the wall of cylinder 22 into the space between expander-spacer 30 and the cylinder wall. The oil rail segment 28 functions as a seal to prevent oil from being drawn upwardly past the ring assembly, particularly on the intake stroke of the piston when the engine is pumping a vacuum. The oil collected between compression ring 26 and oil rail 28 drains inwardly along the upper surface of rail 28 through the large vent openings or notches 84 (FIG. 8) formed on either side of the lower lips 66 of the connecting walls 64, the oil having an unobstructed passage therefrom to the rear of groove 32 from which it is drained by the piston oil slots 48. Further oil drainage capacity is provided by the openings on either side of upper lips 68, by the center openings of loops 62 and by the clearance spaces between bottom loops 74 and rail 28.

The above ring assembly may be modified as shown in FIGS. 9 and 10 (wherein elements identical to those of expander-spacer 30 are given like reference numerals) by providing an expander-spacer having a conecting wall 92 which is bent radially inward (FIG. 10) between its connection with circumferentially adjacent pairs of spring loops 72, 74. In addition, an upper lip 94 extends vertically upward from the upper edge of connecting wall 92 rather than at an incline relative to the axis of the expander-spacer. A modified compression ring 96 may be used with expander-spacer 90 wherein the annular flange 52 is provided with a vertical backside 98 so that the engagement of expander-spacer 90 with compression ring 96 produces only radial expansion forces on compression ring 96. The inwardly bent connecting wall 92 also has a vertical lip 100 extending downwardly from the lower edge thereof opposite each upper lip 94, lip 100 extending beyond the bottom of spring loops 74 so that, as in the previous embodiment, only lips 100 and inner lips 70 of expander-spacer 90 contact the oil rail segment 28.

Another important advantage of the above described oil ring assemblies is the provision of close tolerance spacing of the compression rings 26 or 96 from the oil rail segment 28. This is obtained by providing the respective upper and lower spacing lips 68, 94 and 66, 100 vertically opposite one another and integrally with the connecting walls 64, 92 to thereby form a spacing strut portion in which there is little or no bending or folding. Thus the width or axial dimension of the ring assembly is primarily controlled by the expander-spacer die blanking operation so that production problems are simplified as compared with a conventional formed expander-spacer utilizing bent or folded spacing members which require both accurate blanking and bending.

From the foregoing description it will now be understood that a combined compression and oil ring assembly constructed in accordance with the present invention provides an efficient and accurately dimensioned double-duty ring assembly having a simplified expander-spacer well adapted for operation therewith in a single groove of an axially shortened piston.

We claim:

1. An expander-spacer for a combined compression and oil ring assembly, said expander-spacer comprising a one-piece, annular member having a series of oblong closed loops alternating circumferentially with a series of circumferentially extending walls interconnecting said loops, each of said loops comprising a pair of axially extending legs and U-shaped top and bottom ends, said top ends interconnecting the upper ends of said axial legs and said bottom ends interconnecting the lower ends of said axial legs, each of said top and bottom ends having a pair of legs bent from and extending generally radially inwardly from said axial legs such that the end legs and axial legs forming each side of said closed loops are disposed in co-planar relationship, each of said walls being integrally joined at its ends to adjacent axial legs of adjacent loops and having a substantially straight central ring spacing portion spaced circumferentially from said axial legs and extending generally axially a predetermined distance respectively above and below said axial legs, each of said bottom ends of loops having a lip joined thereto extending generally axially therefrom away from said top end.

2. In a piston provided with a ring groove having top and bottom walls, a back wall and an annular ledge projecting radially outward from the back wall with upper and under surfaces spaced respectively from the top and bottom walls of the ring groove, the combination comprising a cylinder-engaging compression ring having an inner peripheral portion thereof disposed slidably between said groove top wall and said ledge upper surface, a cylinder-engaging oil rail segment disposed adjacent the bottom wall of said oil groove, and an annular expander-spacer disposed between said compression ring and said oil rail segment, said expander-spacer comprising a series of circumferentially spaced top and bottom U-shaped spring loops and a series of circumferentially extending walls individually connecting circumferentially adjacent pairs of said top and bottom loops, said top and bottom U-shaped spring loops extending radially inward from said connecting walls between said ledge and said oil rail segment, said bottom spring loops each having a lip extending therefrom and overlying the inner peripheral edge of said oil rail segment for urging the same radially outward into contact with the cylinder wall, said connecting walls each having a spacing portion extending substantially straight between and bearing at its end against said compression ring and rail segment for spacing said ring and rail segment axially apart and for urging said compression ring radially outward into contact with the cylinder wall, the end of said spacing portion adjacent said rail comprising a lower lip extending downwardly from the lower edge thereof adapted to bear against the upper surface of said oil rail segment, the lower edge of each connecting wall between said lower lip and the adjacent bottom spring loops being spaced above said upper surface of said oil rail segment to provide openings for draining oil therethrough.

3. The combination set forth in claim 2 wherein said lower lips extend downwardly beyond said bottom spring loops to space the latter above the upper surface of said oil rail segment.

4. The combination set forth in claim 3 wherein said spacing portion adjacent said compression ring comprises an upper lip extending upward from the upper edge of said connecting wall opposite said lower lip thereof, said upper lip extending beyond said top spring loops and adapted to bear against said compression ring.

5. The combination set forth in claim 4 wherein said connecting wall is generally U-shaped so as to extend slightly inward from the connection thereof with said loops, and wherein said upper lip of said connecting wall extends vertically from the upper edge thereof.

6. The combination set forth in claim 5 wherein said compression ring has an annular flange dependent therefrom with a vertical inner wall adapted for engagement with said vertical upper lip of said expander-spacer.

References Cited in the file of this patent
UNITED STATES PATENTS

| | | |
|---|---|---|
| 2,917,353 | Baumler et al. | Dec. 15, 1959 |
| 3,024,029 | Brenneke | Mar. 6, 1962 |

UNITED STATES PATENT OFFICE
CERTIFICATE OF CORRECTION

Patent No. 3,151,868 October 6, 1964

Edwin C. Beck et al

It is hereby certified that error appears in the above numbered patent requiring correction and that the said Letters Patent should read as corrected below.

Column 4, line 73, for "end" read -- ends --.

Signed and sealed this 2nd day of March 1965.

(SEAL)
Attest:

ERNEST W. SWIDER
Attesting Officer

EDWARD J. BRENNER
Commissioner of Patents